INVENTOR
CHARLES W. STOKES
BY *William S. Pridion*
ATTORNEY

3,449,085
BAFFLES FOR REACTOR VESSEL
Charles W. Stokes, Lake Charles, La., assignor to Cities Service Research and Development Company, New York, N.Y., a corporation of Delaware
Filed July 26, 1965, Ser. No. 474,806
Int. Cl. B01t 1/14
U.S. Cl. 23—283      8 Claims

ABSTRACT OF THE DISCLOSURE

A cylindrical reactor vessel having an internal axially located recycling conduit with the intake of a transversely mounted centrifugal pump at the base of the conduit and baffles located opposite the discharge ports of the centrifugal pump to eliminate vortex separation of the discharged fluid into the gas and liquid phases. The baffles are a plurality of substantially vertical plates supported by the distributor plate and angularly placed in relation to the radius of reactor vessel preferably at 60°.

---

This invention relates to an improvement in a reactor and more particularly to the positioning of a baffle in a reactor.

The practice of the instant invention contemplates the use of a substantially vertical, elongated reactor. Within the reactor there is contained, among other elements, a conduit for recycling liquid, a distributor plate and in the lower portion of the reactor, a horizontally disposed centrifugal pump in communication with the conduit. The centrifugal pump functions as a recycle pump to recycle liquid passing down the conduit, as well as any small amounts of gas that may have passed down the conduit. Gas and liquid is introduced into the lower portion of the reactor by means of an inlet located at the bottom of the reactor. The pump discharge tends to create a vortex in the lower portion of the reactor. The vortex thus created forces the heavier liquid, which is being discharged tangentially from the ports spaced about the periphery of the pump diffuser, toward the wall of the reactor and the lighter gas toward the center of the reactor. Thus, two separate phases are established, a gas phase and a liquid phase. This two-phase separation persists as the liquid and the gas flow upwardly into the reaction zone of the reactor, resulting in the deterioration of the reaction conditions and in preventing the reactor from operating at maximum efficiency.

It is an object of this invention to provide an improved reactor. It is another object of this invention to provide a novel apparatus in the reactor so as to avoid vortex formation. These and other objects of this invention will become apparent from the description of the invention which follows, and from the accompanying drawings which illustrate a preferred embodiment of the invention, and in which.

Figure 1:
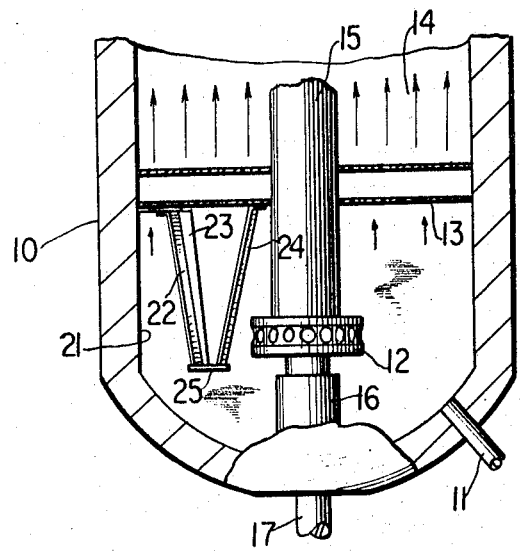
FIGURE 1 is a cross-sectional view of the lower portion of a reactor with parts in elevation.

The reactor 10 as shown in FIGURE 1, is a thick walled, generally cylindrical vessel adapted for liquid-gaseous contact, as for example, in the hydrogenation of hydrocarbon oil. It is to be understood, however, that the following invention may be utilized in many types of processes and is not limited to the hydrogenation of hydrocarbon oil.

For the purpose of hydrogenation of a liquid, a reactant inlet for the hydrogen gas and liquid is provided at 11, such liquid and gas mixing with recycle liquid discharged from a centrifugal pump 12. The total liquid and gas then passes upwardly through a distributor plate 13, into the reaction zone 14 of the reactor.

For hydrogenation purposes, the reactor is usually filled with contact material, which may be from about 100 microns to about 1/8″ in size. In order to accomplish the desired contact, the liquid will flow upwardly through such a bed of contact material at a rate from 20 to 200 gallons per minute per square foot of horizontal cross-section of the reactor. As this flow rate is normally above the expected feed rate, the total flow required is accomplished by recycling more or less of the liquid from the upper part of the reactor back to the bottom of the reactor.

It has been found entirely practical to use an internal conduit for such a recycle, a minimum of entrained gas or material is carried over into internal conduit 15 which extends downwardly to below the distributor plate 13. This conduit thus serves to supply the pump 12 which is required to accomplish sufficient pressure head on the liquid to cause it to rise through the solids in the reactor and place them in random motion. Pump 12 is driven by motor 16 which is mounted on shaft 17. The motor 16 which is employed is hydraulic, although it may be gas or electric as well.

Figure 2:
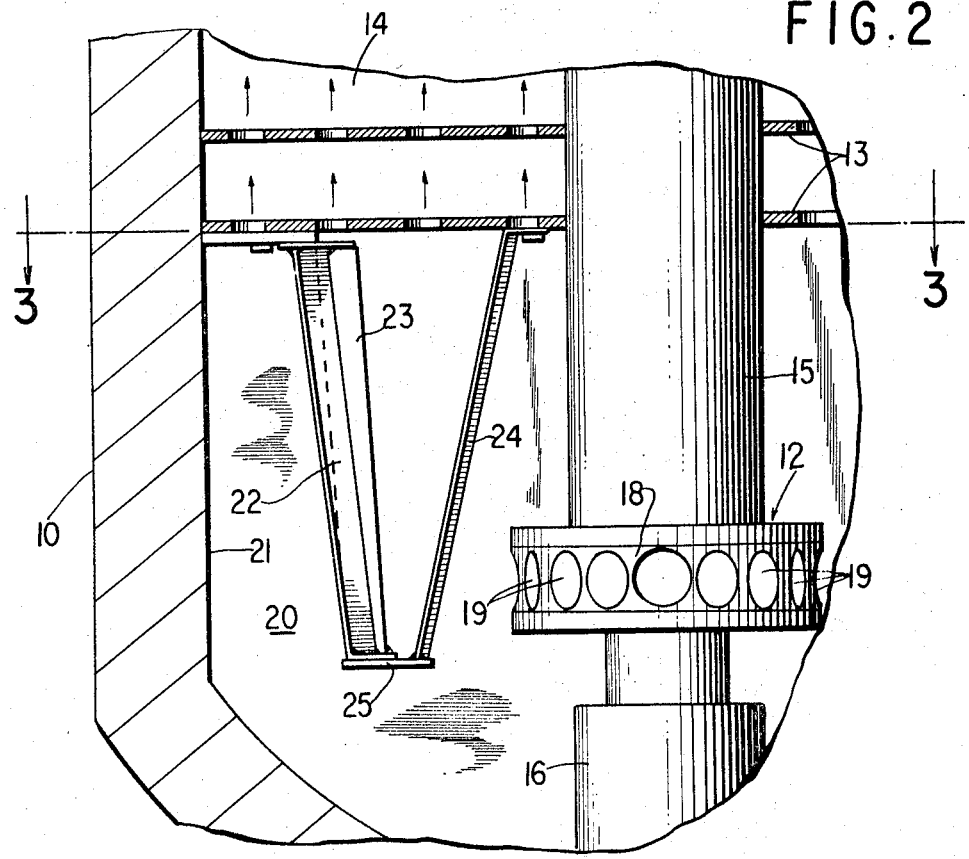
FIGURE 2 is an enlarged cross-sectional view of the lower portion of a reactor with parts in elevation.

Pump 12 includes a diffuser 18, which is provided with ports 19 spaced about its periphery. Liquid is discharged tangentially from ports 19 into annular zone 20 formed by the exterior of the conduit 15 and the pump 12 and the interior wall of the reactor 21. Generally vertical baffles 22, 23 and 24 in annular zone 20 are secured to a rigid plate 25 at their lower ends and secured to distributor plate 13 at their upper ends. When liquid discharged from ports 19 mixes with hydrogen gas and liquid being introduced via inlet 11 into annular zone 20, vortex formation tends to occur in annular zone 20. Baffles 22, 23 and 24, as shown in FIGURE 2, eliminate vortex formation and allow the liquid and hydrogen gas to form a single phase during its passage from annular zone 20 through distributor plate 13 and on up into reaction zone 14.

Figure 3:
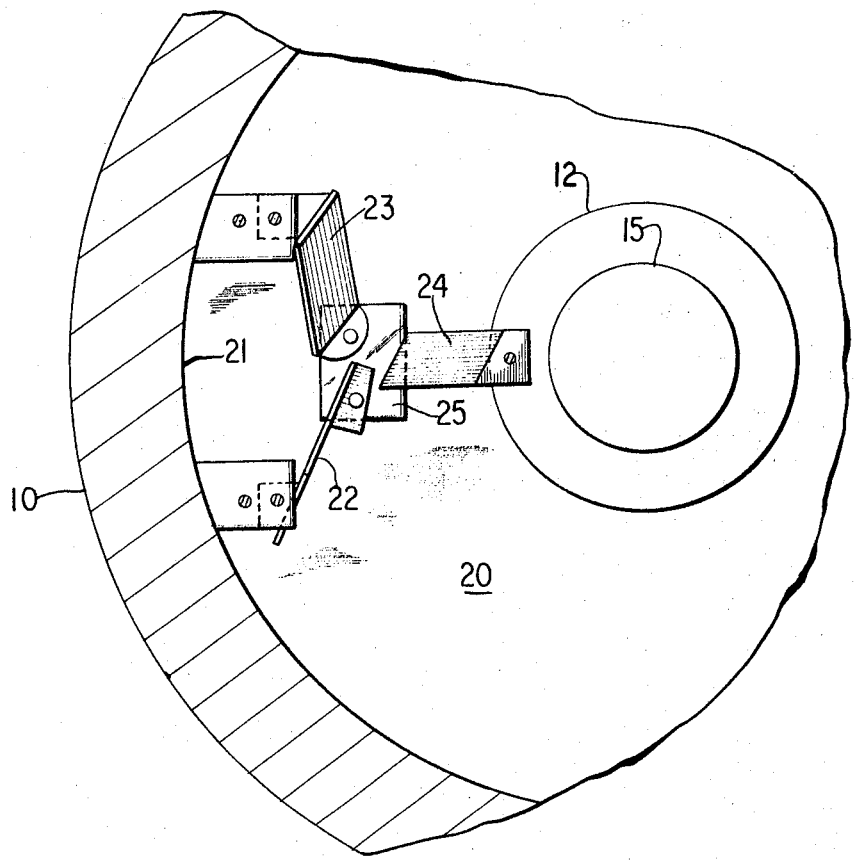
FIGURE 3 is a sectional view taken along the line 3—3 of FIGURE 2.

Referring to FIGURE 3, it can be seen that baffles 22, 23 and 24 are positioned in a horizontal plane in relation to the ports 19 spaced about the periphery of the pump 12, between tangential and radial. The angle formed between each individual baffle and the radial can be from about 10° to about 80°. In the preferred embodiment the angle formed is about 60°. The baffles are preferably sloped in a vertical plane from outward at the top of the annular zone 20, where the upper ends of the baffles are secured to distributor plate 13, and then inwardly toward rigid plate 25 to which the baffles are secured at their lower ends. Rigid plate 25 is preferably positioned at about the mid-point of annular zone 20 as shown.

By placing the baffles in the position described, the vortices formed in the annular zone are substantially eliminated. As a result of the elimination of the vortices, two-phase separation of gas and liquid was eliminated. The passage of a more uniform mixture of liquid and gas from the annular zone, through the distributor plate and on into the reaction zone results in improved reaction conditions.

In the embodiment shown, a single grouping of three baffles is shown. This is merely one embodiment. For example, baffle groupings in which the number of individual baffles is less than, or greater than, three may be conveniently employed. Additionally, a plurality of baffle groupings, or clusters, may be utilized effectively.

The sizes of the individual baffles may vary over a wide range. The only limitation on the size of the baffle being the dimensions of the annular zone of the reactor.

Obviously, many modifications and variations of the present invention are possible in the light of the above teachings. It is, therefore, to be understood that within the scope of the appended claims, the invention may be practiced otherwise, than as specifically described.

I claim:

1. A substantially vertical elongated reactor for carrying out liquid phase reactions, said reactor having a vertical internal conduit forming a liquid path within said conduit, a pump in the lower central portion of said reactor in communication with said liquid path and adapted to receive a liquid mixture from said path, a diffuser on said pump, ports spaced about the periphery of said diffuser adapted to discharge said liquid mixture from said pump, said pump being positioned in said lower central portion of said reactor so as to form an annular zone between the inner wall of said reactor and the exterior of said conduit and said pump, a distributor plate positioned above said pump in the lower portion of said reactor, said distributor plate having an essentially circular cross-sectional area substantially equal to the cross-sectional area of said reactor, a plurality of baffles extending downwardly from said distributor plate in said annular zone and secured at their lower ends to a rigid plate, said rigid plate being positioned at a midpoint of said annular zone and below the level of said diffuser, said baffles being positioned in a horizontal plane at an angle between about 10° and about 80° from the radial and said baffles being positioned in a vertical plane so as to slope downwardly and inwardly toward the center of the annular zone.

2. An apparatus for carrying out fluid chemical reactions comprising:
   (a) a substantially vertical cylindrically shaped reactor;
   (b) a vertical conduit mounted within the reactor forming a fluid path between the upper and the lower portion of the reactor;
   (c) a horizontally mounted centrifugal pump having an inlet port connected to the lower end of the conduit in communication with the fluid path, and a diffuser having outlet ports circumferentially spaced so as to discharge the fluid radially into the lower portion of the reactor;
   (d) a generally vertical plate shaped baffle positioned opposite the diffuser, whereby the flow of fluid in the lower portion of the reactor is caused to inhibit the separation of gas and liquid phases.

3. The apparatus of claim 2 wherein the baffle is positioned in a horizontal plane at an angle between about 10° and about 80° from the radial.

4. The apparatus of claim 3 wherein the baffle slope is a vertical plane downwardly and inwardly toward the center of the reactor opposite the periphery of the diffuser.

5. The apparatus of claim 4 wherein the baffles are arranged as a plurality of baffles circumferentially located opposite the diffuser.

6. The apparatus claim 5 which further comprises a distributor plate positioned above the lower portion of the reactor the distributor plate having a multiplicity of openings through which the reactant fluid passes from the lower portion of the reactor to the central and upper portions of the reactor.

7. The apparatus of claim 6 wherein the baffles are fixedly mounted to the underside of the distributor plate.

8. The apparatus of claim 7 wherein the baffles are positioned in a horizontal plane at an angle of about 60° from the radial.

References Cited

UNITED STATES PATENTS

| | | | |
|---|---|---|---|
| 2,145,679 | 1/1939 | Beall et al. | 23—290 |
| 2,871,108 | 1/1959 | Knapp | 23—288.3 |
| 3,227,528 | 1/1966 | Jaeger | 23—285 |

JAMES H. TAYMAN, Jr., *Primary Examiner.*

U.S. Cl. X.R.

23—285, 290; 208—143; 259—97, 108; 261—87, 93